(No Model.) 2 Sheets—Sheet 1.

G. F. MOFFETT.
CONDUIT ELECTRIC RAILWAY.

No. 498,135. Patented May 23, 1893.

WITNESSES:
J. A. Bergstrom
C. Sedgwick

INVENTOR:
G. F. Moffett
BY
ATTORNEYS.

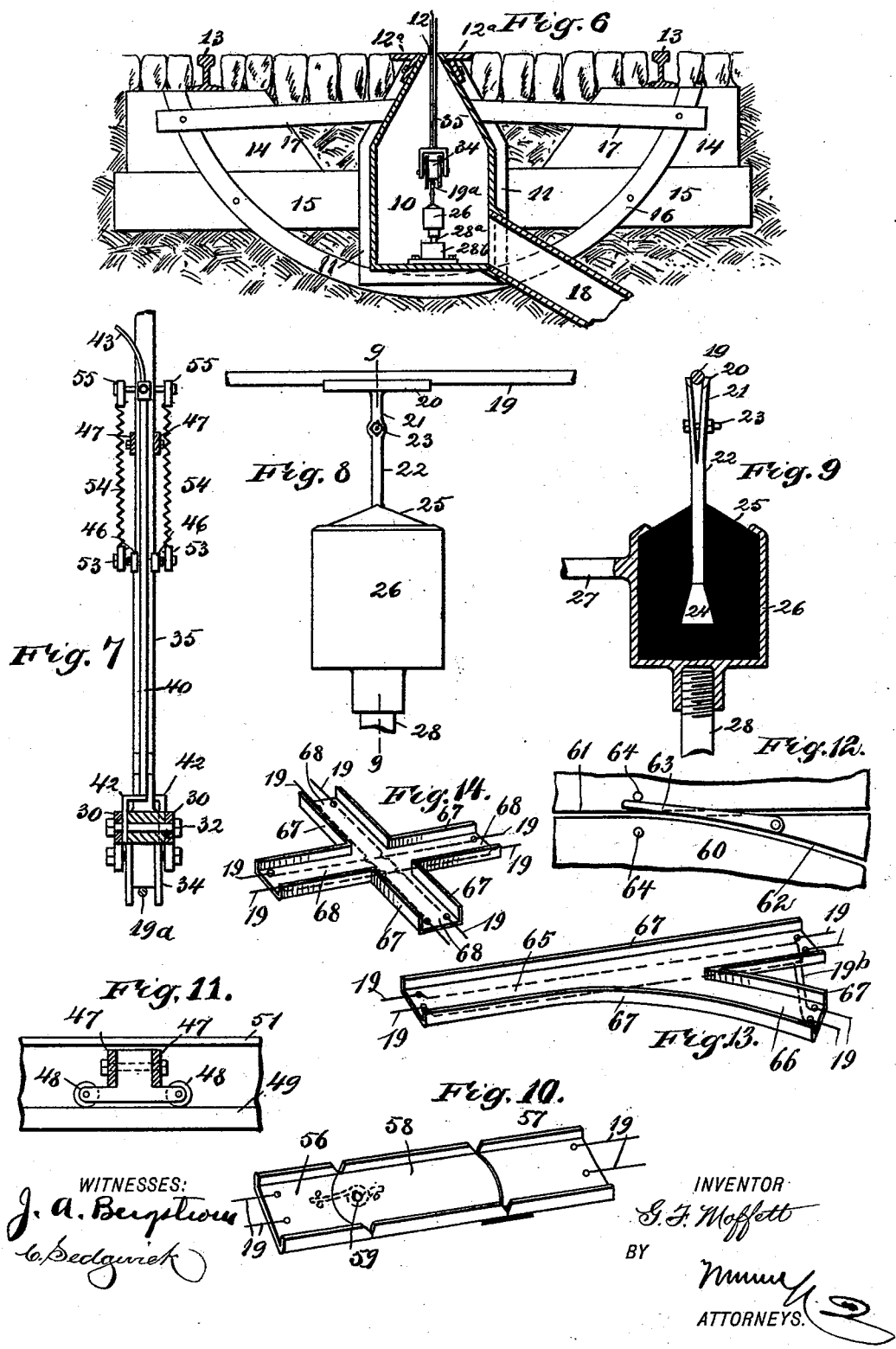

UNITED STATES PATENT OFFICE.

GEORGE FRANK MOFFETT, OF PORTLAND, OREGON.

CONDUIT-ELECTRIC RAILWAY.

SPECIFICATION forming part of Letters Patent No. 498,135, dated May 23, 1893.

Application filed October 7, 1892. Serial No. 448,124. (No model.)

*To all whom it may concern:*

Be it known that I, GEORGE FRANK MOFFETT, of Portland, in the county of Multnomah and State of Oregon, have invented a new and Improved Electric Railway, of which the following is a full, clear, and exact description.

My invention relates to improvements in electric railways; and the object of my invention is to produce a conduit system railway which may be comparatively cheaply built, which has continuous metallic line conductors but which may be operated with a single trolley wire with the return through the rails, which is constructed so that the conduit will be always well drained and may be easily reached to make repairs or perform any necessary operations within it, which has the trolley adapted to pass easily over grades and around curves, and in which the trolley is constructed so as to run nicely upon the line conductors and to adjust itself to the various movements of the car.

To this end my invention consists in an electric railway, the construction of which will be hereinafter described and claimed.

Reference is to be had to the accompanying drawings, forming a part of this specification, in which similar figures of reference indicate corresponding parts in all the views.

Figure 1:
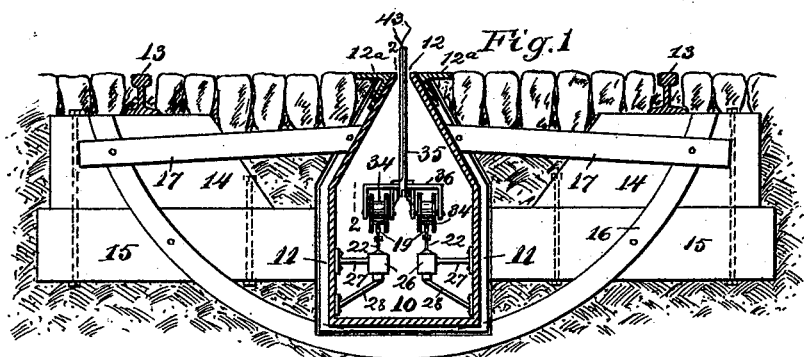
Figure 2:
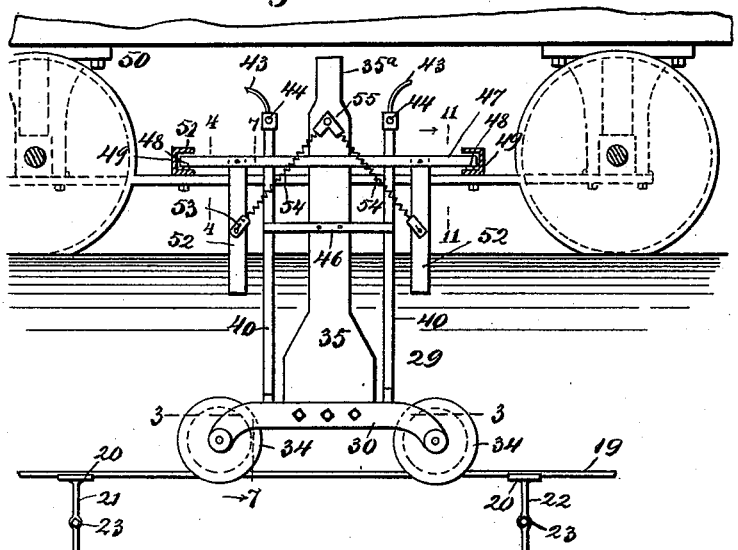
Figure 4:
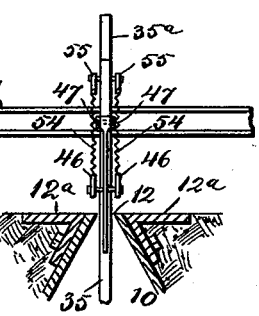
Figure 3:
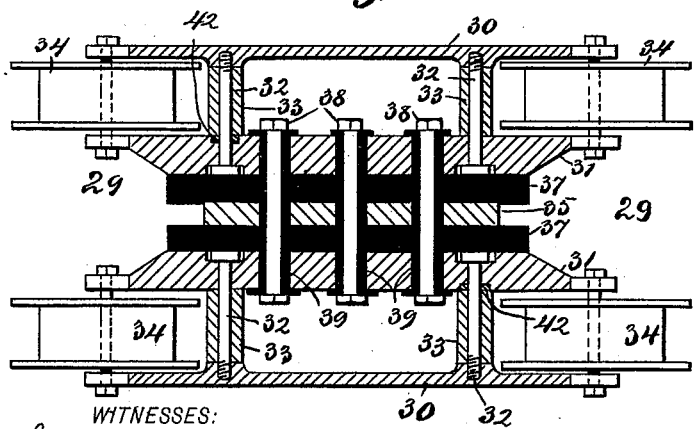
Figure 5:
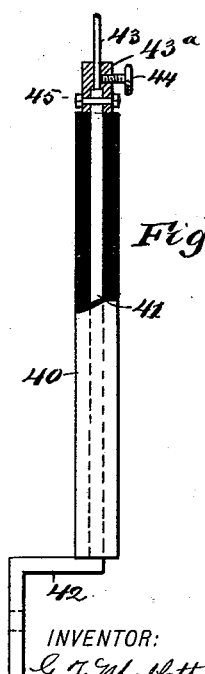

Figure 1 is a cross section of the railway embodying my invention, showing the position of the trolley and conductors within the conduit. Fig. 2 is a sectional side elevation of the trolley, on the line 2—2 in Fig. 1, showing the manner in which it is suspended from the car. Fig. 3 is an enlarged sectional plan of the double trolley on the line 3—3 in Fig. 2. Fig. 4 is a sectional elevation of the trolley support on the line 4—4 in Fig. 2. Fig. 5 is an enlarged detail view of the trolley conductor. Fig. 6 is a cross section through the railway track and conduit, showing the sewer connection of the conduit, showing also a single trolley and conductor within the conduit. Fig. 7 is an enlarged vertical section of the trolley on the line 7—7 in Fig. 2, but with the trolley adapted for use on a single wire. Fig. 8 is a broken enlarged detail elevation of one of the main conductor insulators. Fig. 9 is a vertical section on the line 9—9 in Fig. 8. Fig. 10 is a detail perspective view of a switch adapted to be used where the conductors cross a cable. Fig. 11 is an enlarged cross section on the line 11—11 in Fig. 2. Fig. 12 is a broken plan view of the switch plate used at the junction of the main track and siding. Fig. 13 is a perspective view of a trolley supporting plate adapted to be used in connection with the switch plate shown in Fig. 12; and Fig. 14 is a perspective view of a trolley supporting plate adapted for use where two tracks cross at right angles.

The conduit 10 is arranged beneath the track in the usual way and it has its walls formed so that they may be taken apart in sections, and the walls of the conduit are suspended by inclosing arch shaped frames or yokes 11. At the top of the conduit is a slot 12 of the usual kind, through which the stem of the trolley runs, as hereinafter described, and on opposite sides of the slot the conduit is reinforced by angle plates $12^a$ which are secured to the conduit walls. The conduit is arranged between the track rails 13 and these are supported on sleepers 14 and 15 which are arranged one above another on opposite sides of the conduit, the upper and lower sleepers being bolted together, as shown by dotted lines in Fig. 1. The sleepers on opposite sides of the conduit are connected by a nearly semicircular tie bar 16 which extends beneath the conduit and the ends of which are secured to the sleepers. The conduit is strengthened and braced by cross braces 17 which are bolted to the sleepers and tie bar 16, and also to the frame 11.

Opening from the lower portion of the conduit at necessary intervals are pipes 18 which lead to the sewer and which drain the conduit so that there is no danger of its filling up. Extending longitudinally through the conduit are the conducting wires 19 which form a continuous metallic circuit upon which the trolley runs, one being the positive and the other the negative wire, but if desired a single wire $19^a$ may be used, as shown in Fig. 6. The wires 19 are held at intervals between clamping pieces 20 formed on the upper ends 21 of the forked posts 22 and the members of the clamps or posts are jammed together so as to hold the wire, by a bolt 23 which extends transversely through them. The lower end 24 of the post 22 is enlarged, as shown in Fig. 9, and this prevents the post from being easily removed from its inclosing bed 25 of insulating material, this bed being held in a suitable cup or socket 26 which is supported by brackets 27 and 28, these being fastened to the side walls of the conduit. Where a single wire is used, as in Fig. 6, however, the socket 26 is supported upon a post 28ª which extends vertically downward and is secured to a base or pedestal 28ᵇ.

Where the continuous metallic circuit comprising the parallel conductors 19 is used, a double trolley 29 is employed, this trolley being composed of two similarly connected frames shown clearly in Fig. 3, and each frame comprises an outer side piece 30 and an inner side piece 31, the outer and inner side pieces being connected by bolts 32 which extend through washers or sleeves 33, and the latter hold the side pieces the requisite distance apart. Between the outer and inner side pieces and at opposite ends of the frames, are held the flanged trolley wheels 34 which run upon the conductors 19. The frames just described are secured to a centrally vertical stem 35 which extends upward through the slot 12 of the conduit, the stem being reduced at its upper end, as shown at 35ª to enable it to be conveniently grasped so that the trolley may be raised from the conductors and the circuit broken when necessary. The trolley frame may be covered by a hood 36, (see Fig. 1,) if desired. The two opposite frames of the double trolley are insulated from each other and from the stem 35 by strips of insulating material 37 which are inserted between the inner side pieces 31 and the stem. The two frames and the stem are all bolted together by bolts 38 these being inclosed by insulating sleeves 39, and the two frames on opposite sides of the stem are thus thoroughly insulated from each other.

The trolley conductors comprise insulating sleeves 40 which are held in a vertical position in the front and rear of the stem 35, and extending through each of the insulating sleeves is a conductor 41, the lower end of which is formed into an angular bend 42, and the latter is bolted to one of the trolley frames, being preferably secured on one of the bolts 32, as shown in Fig. 3.

It will be noticed that when the conductor 41 is secured to one of the trolley frames and the opposite conductor is secured to the frame on the opposite side of the stem 35, provision is thus made for making a continuous circuit with the motor and returning the current to one of the conductors 19, as hereinafter described. The conductor 41 extends through the sleeve 40 and connects with the motor wire by means of a metallic sleeve 43ª, the sleeve and wire being held in place by binding screws 44 and 45, see Fig. 5. The motor conductors are held from swaying sidewise by the guards 46 which are secured to the stem 35 and embrace the sleeves 40, as shown in Fig. 2.

The upper portion of the stem 35 is embraced by parallel bars 47, the ends of which run on rollers 48 which are held in cross timbers 49 on the car truck 50, and the cross timbers have guard plates 51 on top which prevent the bars 47 from rising. The arrangement of the rollers is to permit the car to pass easily around a curve without straining the trolley, as the bars will have the necessary side movement. In front and rear of the trolley conductors are vertical guide bars 52, which slide in the slot 12 of the conduit and which thus keep the slot open and throw any obstruction to one side, and the trolley conductors are thus shielded. It will be seen that the trolley may be run in either direction and the guide bars will perform their work in either case.

Fixed diagonally on both sides of the guide bars are plates 53 to which are secured springs 54, and the upper ends of the springs are secured to angle plates 55 which are pivoted on the sides of the stem 35. The springs assist in bracing the trolley and permit the necessary movement of the trolley and stem, when the car starts up or down a grade.

It will be seen that this conduit may be used for a cable if desired, and where it is crossed by another conduit and cable a switch shown in Fig. 10 is used. The switch has stationary end pieces 56 and 57 with side flanges thereon, and to these end pieces are secured the conductors 19. A switch arm 58 forms the middle portion of the switch and this contacts with both stationary parts, and it connects with the part 56 by a spring hinge 59. The switch arm 58 is adapted to be arranged above the cable and in the path of the cable plow, and when the latter strikes the cable arm it pushes the arm to one side, and after the plow passes, the arm swings back to its normal position, the several parts of the switch forming a complete connection between the adjacent conductors 19.

At a switch, a plate 60 is used to cover the intersecting conduits, the plate having slots 61 and 62 to align respectively with the conduit slots of the main line and siding. Near the junction of the slots is pivoted an ordinary switch rail or tongue 63, which swings between studs 64 on the plate 60. When the trolley is to run along the main line, the tongue is turned to close the slot 62 and when the trolley is to take the siding the slot 61 is closed and the slot 62 opened. A trolley supporting plate 65 is adapted to be placed beneath the plate 60, and it has a branch arm 66 adapted to extend beneath the slot 62. The plate 65 and its arm 66 have flanges 67 at the edges between which the trolley wheels run when the trolley is passing a switch. The conductors 19 are supported on the plate 65 and connect as shown at 19ᵇ, Fig. 13, with similar conductors on the siding. The conductors are insulated, however, from the plate so that the trolley receives no current as it passes over the plate, but the momentum of the car carries the trolley across the plate until it comes again into contact with the conductors.

When the tracks cross at right angles the trolley plate shown in Fig. 14 is used which plate has the arms 68 arranged at right angles to each other and provided with guide flanges 67 like those just described. This trolley plate is placed beneath the intersecting slots and serves to support and guide the trolley. The conductors extend beneath the plate, being insulated therefrom and the trolley crosses the plate and strikes the conductors on the other side.

When a single conductor 19$^a$ is used, the trolley has but one frame formed by fastening together the two side pieces 30, these being secured by the bolts 32, as described, and the wires 43, at the ends of the trolley conductors, are connected together and also connected to one pole of the motor, the current being returned from the motor to the rails in the same way as it is in the overhead trolley system.

In carrying out my invention, the conduit should be provided at frequent intervals with manholes large enough to permit a person to enter the conduit when necessary.

Having thus described my invention, I claim as new and desire to secure by Letters Patent—

1. In an electric railway, the combination with the conduit and the track rails, of sleepers arranged on opposite sides of the conduit and supporting the rails, curved tie bars extending beneath the conduit and secured to the sleepers, and braces secured to the sleepers, tie bars, and conduit, substantially as described.

2. In an electric railway, the conduit comprising a suitable wall, and inclosing frames or yokes arranged at intervals outside the wall, substantially as described.

3. In an electric railway, the combination of the intersecting conduits, the slotted switch plates placed at the junction of the conduit slots, and the trolley supporting plates adapted to be placed beneath the switch plates to support the trolley wheels, substantially as described.

4. The combination with the conduit conductors, and the trolley held to run thereon and having suitable electric connections with the car motor, of cross bars suspended beneath the car, and parallel side bars connected with the trolley and held to run on rollers on the cross bars, substantially as described.

5. The combination with the trolley adapted to run upon conductors and having an upwardly extending stem and electrical connections with a car motor as specified, of cross bars arranged beneath the car, parallel side bars having their ends held to slide on the cross bars, the side bars being also arranged to embrace the trolley stem, guide bars extending downward from the side bars in front and rear of the trolley conductors, and a yielding connection between the guide bars and the trolley stem, substantially as described.

6. The combination with the conduit and its conductors and the car, of a two-part frame having one side insulated from the other, wheels mounted on opposite sides of the frame to run upon the conductors, an upwardly extending stem insulated on the frame and projecting through the conduit slot, conductors extending upward from the sides of the frame and connected with the motor of the car, a laterally movable support for the frame stem, depending guide arms secured to the laterally movable support and extending downward through the conduit slot in the front of and behind the stem, and springs connecting the guide arms and the stem, substantially as described.

GEORGE FRANK MOFFETT.

Witnesses:
SAM L. BEARY,
THOS. MOFFETT.